United States Patent [19]

Kitagawa et al.

[11] 4,355,820
[45] Oct. 26, 1982

[54] STEERING ASSEMBLY SUPPORTING DEVICE OF A MOTOR VEHICLE

[75] Inventors: Naoto Kitagawa; Kunihiko Masaki; Hiroyuki Watanabe, all of Toyota, Japan

[73] Assignee: Toyota Jidosha Kogyo Kabushiki Kaisha, Toyota, Japan

[21] Appl. No.: 210,307

[22] Filed: Nov. 25, 1980

[30] Foreign Application Priority Data

Jun. 12, 1980 [JP] Japan .................................. 55/78329

[51] Int. Cl.³ ............................................... B62D 1/18
[52] U.S. Cl. ....................................... 280/779; 74/492
[58] Field of Search ....................... 280/777, 779, 780; 74/492; 296/188

[56] References Cited

U.S. PATENT DOCUMENTS 1,269,955 6/1918 O'Neil .................................. 280/779
4,241,937 12/1980 Eggen et al. ......................... 280/777
4,274,646 6/1981 Olligschlager et al. .......... 74/492 X Primary Examiner—Joseph F. Peters, Jr.
Assistant Examiner—Michael Mar
Attorney, Agent, or Firm—Kenyon & Kenyon

[57] ABSTRACT

A steering assembly supporting device of a motor vehicle comprising a horizontally extending base portion and a vertically extending leg portion. The base portion extends in parallel to the cowl inner panel at a position which is arranged in the rear of and remote from the cowl inner panel. The outer end of the base portion is fixed onto the cowl side panel and the lower end of the leg portion is fixed onto the floor. The intermediate portion of the base portion is fixed onto the cowl inner panel via a bracket. The steering tube of the steering assembly is supported by the intermediate portion of the base portion.

12 Claims, 16 Drawing Figures

STEERING ASSEMBLY SUPPORTING DEVICE OF A MOTOR VEHICLE

DESCRIPTION OF THE INVENTION

The present invention relates to a steering assembly supporting device of a motor vehicle.

The body of a motor vehicle normally comprises cowl side panels extending forward from the front ends of corresponding front door opening flanges, a cowl inner panel arranged to extend between the cowl side panels at a position beneath a wind shielding glass, and a dash panel separating a driver's compartment from an engine compartment. In addition, in a motor vehicle, the tip of a steering tube passes through the dash panel and extends to the inside of the engine compartment. In such a motor vehicle, the steering tube, used for supporting a steering shaft, is normally supported in such a way that the intermediate portion of the steering tube is fixed onto both the cowl inner panel and the dash panel via a steering support, and that the steering tube is fixed onto the dash panel at a position wherein the steering tube passes through the dash panel. However, in the case wherein the steering tube is supported as mentioned above, since the distance between the rear end of the steering support, at which the steering tube is supported, and the front end of the steering support, at which the steering support is fixed onto the cowl inner panel, is very long, when a motor vehicle is driven at a high speed or on a rough load, a problem occurs in that the steering wheel vibrates.

An object of the present invention is to provide a steering assembly supporting device capable of preventing the steering wheel from vibrating.

According to the present invention, there is provided a steering assembly supporting device of a motor vehicle comprising a steering assembly, a floor, front door opening flanges, cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel, said device comprising: an L-shaped steering assembly supporting body comprising a leg portion and a base portion transversely extending substantially in parallel to the cowl inner panel, said base portion having an inner end, an intermediate portion and an outer end fixed onto the cowl side panel, said leg portion entending downwards from the inner end of said base portion and having a lower end fixed onto the floor, and; a bracket extending backwards from the cowl inner panel and having a rear end and a front end fixed onto the cowl inner panel, said rear end being connected to the intermediate portion of said base portion, the steering assembly being supported by the intermediate portion of said base portion.

The present invention may be more fully understood from the description of preferred embodiments of the invention set forth below, together with the accompanying drawings.

DESCRIPTION OF A PREFERRED EMBODIMENT

Figure 1:
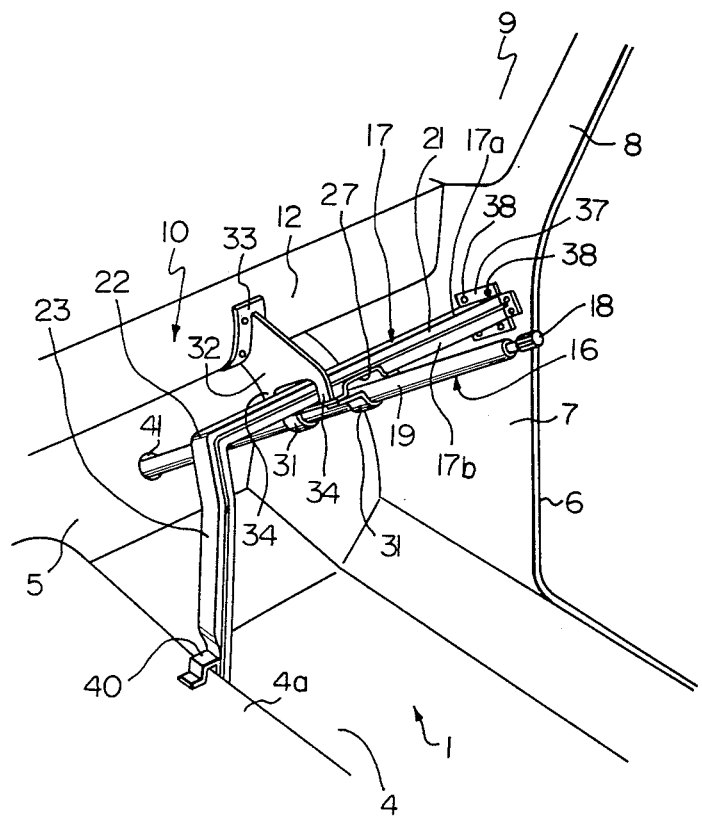
FIG. 1 is a perspective view of the interior of the driver's compartment of a motor vehicle.
Figure 2:
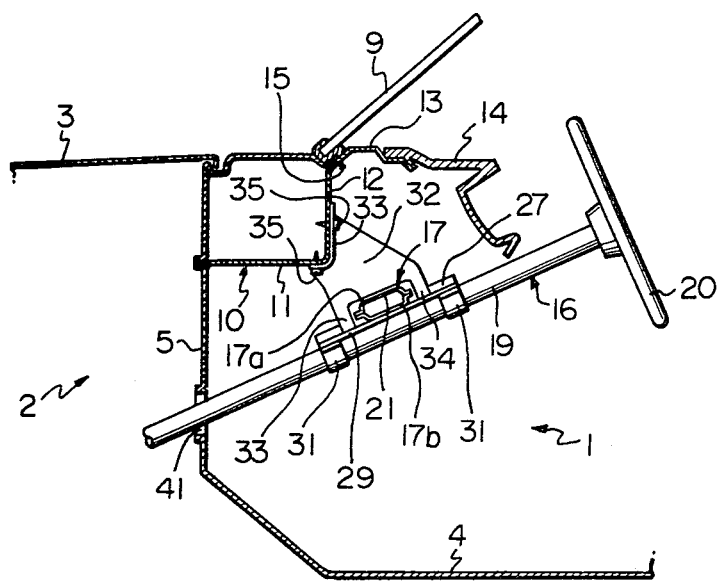
FIG. 2 is a cross-sectional side view of FIG. 1.
Figure 3:
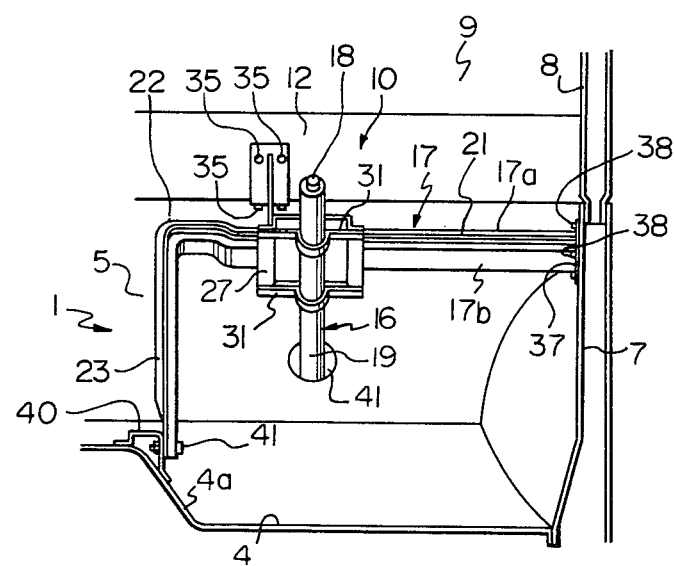
FIG. 3 is a front view of FIG. 1.
Figure 4:
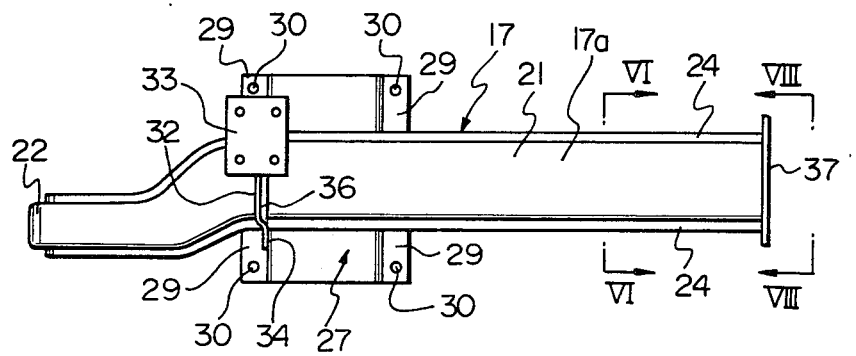
FIG. 4 is a plan view of an embodiment of a steering assembly supporting device according to the present invention.
Figure 5:
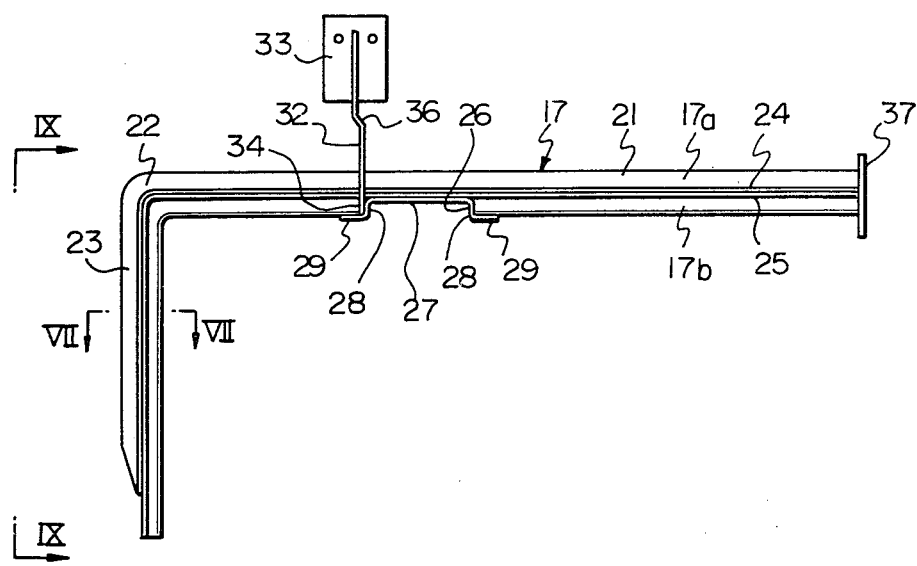
FIG. 5 is a side view of FIG. 4.
Figure 6:
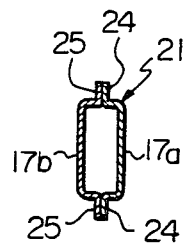
FIG. 6 is a cross-sectional view taken along the line VI—VI in FIG. 4.

Referring to FIGS. 1 through 3, 1 designates a driver's compartment, 2 an engine compartment, 3 an engine hood and 4 a floor; 5 designates a vertically extending dash panel separating the driver's compartment 1 from the engine compartment 2, 6 a front door opening flange, 7 a cowl side panel extending forward from the front end of the front door opening flange 6, 8 a front pillar forming a portion of the front door opening flange 6 and supporting the roof (not shown) of a motor vehicle, and 9 a wind shielding glass. A cowl inner panel 10 is arranged to extend between the cowl side panels 7, one of which is not illustrated in FIGS. 1 through 3. As illustrated in FIG. 2, the cowl inner panel 10 comprises a bottom wall 11 extending substantially in parallel to the floor 4, a side wall 12 vertically extending upwards from the rear end of the bottom wall 11 and an extension wall 13 extending backwards from the upper end of the side wall 12. A dash board 14 is mounted on the rear end of the extension wall 13. The front end of the bottom wall 11 of the cowl inner panel 10 is fixed onto the top end of the dash panel 5, and the bottom end of the wind sielding glass 9 is supported on a bending portion 15 located between the side wall 12 and the extension wall 13. As illustrated in FIGS. 1 through 3, a steering assembly 16 and a steering assembly supporting body 17 are arranged within the driver's compartment 1. The steering assembly 16 comprises a steering shaft 18, a steering tube 19 enclosing the steering shaft 18 and supporting it, and a steering wheel 20 fixed onto the end of the steering shaft 18. The steering assembly supporting body 17 comprises a base portion 21 extending substantially in parallel to the cowl inner panel 10 at a position below the cowl inner panel 10, and a substantially vertically extending leg portion 23 bending downwards from the inner end 22 of the base portion 21. As illustrated in FIGS. 1 through 7, the steering assembly supporting body 17 comprises a pair of members 17a, 17b, each having a dish shaped cross-section. The member 17a has a pair of outwardly extending flanges 24, and the member 17b has a pair of outwardly extending flanges 25. The members 17a and 17b are interconnected to each other in such a way that the flanges 24 of the member 17a are welded to the corresponding flanges 25 of the member 17b by spot welding. Consequently, it will be understood that the steering assembly supporting body 17 has a hollow tubular shape. As illustrated in FIGS. 1 and 5, the bottom wall portion of the member 17b, which is located above the steering tube 19, is depressed to a level of the flanges 25 of the member 17b, and a steering support 27, having a dish shaped cross-section, is welded onto a depression 26 thus formed. The steering support 27 comprises a pair of opposed side walls 28, and a pair of flanges 29, each extending outwards from the corresponding side wall 28. As illustrated in FIG. 4, the steering support 27 projects forward and backward from the steering supporting body 17, and bolt holes 30 are formed on the flanges 29 of the projecting portion of the steering assembly support body 17. As illustrated in FIGS. 1 through 3, a pair of spaced brackets 31 is fixed onto the steering tube 19 and secured onto the flanges 29 of the steering support 27 by bolts (not shown) which are inserted into the bolt holes 30 (FIG. 4). As illustrated in FIGS. 1 and 2, a bracket 32 is arranged between the steering assembly supporting body 17 and the cowl inner panel 10. The bracket 32 has on its one end a mounting flange 33 formed in one piece and has on its other end a pair of spaced arms 34 projecting downward. As illustrated in FIG. 2, the mounting flange 33 of the bracket 32 is fixed onto both the bottom wall 11 and the side wall 12 of the cowl inner panel 10 by means of bolts 35 and, as illustrated in FIGS. 1 and 5, a pair of arms 34 of the bracket 32 is welded onto the side wall 28 of the steering support 27. In addition, as illustrated in FIGS. 4 and 5, a step portion 36 is formed on the bracket 32.

Figure 7:
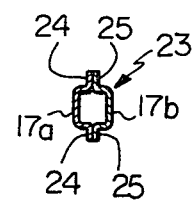
FIG. 7 is a cross-sectional view taken along the line VII—VII in FIG. 5.
Figure 8:
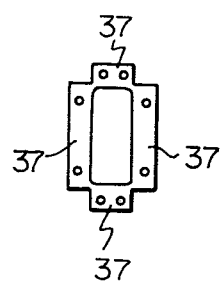
FIG. 8 is a cross-sectional view taken along the line VIII—VIII in FIG. 4.
Figure 9:
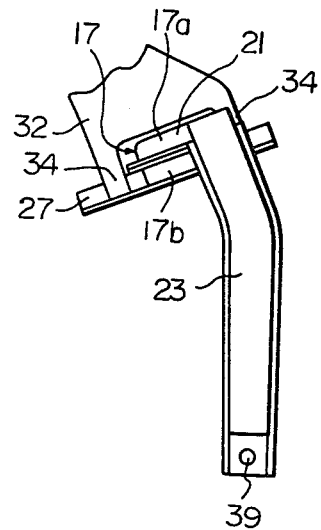
FIG. 9 is a side view taken along the line IX—IX in FIG. 5.

As illustrated in FIGS. 1, 3, 4, and 8, a flange 37 is formed in one piece on the outer end of the base portion 21 of the steering assembly support body 17 and secured onto the cowl side panel 7 by means of bolts 38 at the root portion of the front pillar 8. As illustrated in FIG. 4, the base portion 21 of the steering assembly supporting body 17 has an approximately uniform width at a position between the flange 37 and the steering support 37. In addition, the width of the base portion 21 is gradually reduced towards the inner end 22 from the steering support 27 and, at the same time, the base portion 21 is slightly bent backwards. As illustrated in FIG. 7, the leg portion 23 of the steering assembly supporting body 17 has a hollow tubular shape and, as illustrated in FIG. 9, a bolt hole 39 is formed on the lower end of the leg portion 23. As illustrated in FIGS. 1 and 3, the floor 4 has a raised portion 4a so that the transmission of an engine (not shown) is arranged beneath the raised portion 4a. A bracket 40 is fixed onto the raised portion 4a, and the lower end of the leg portion 23 of the steering assembly supporting body 17 is secured onto the bracket 40 by means of a bolt 41 which is inserted into the bolt hole 39 (FIG. 9) of the leg portion 23.

Figure 10:
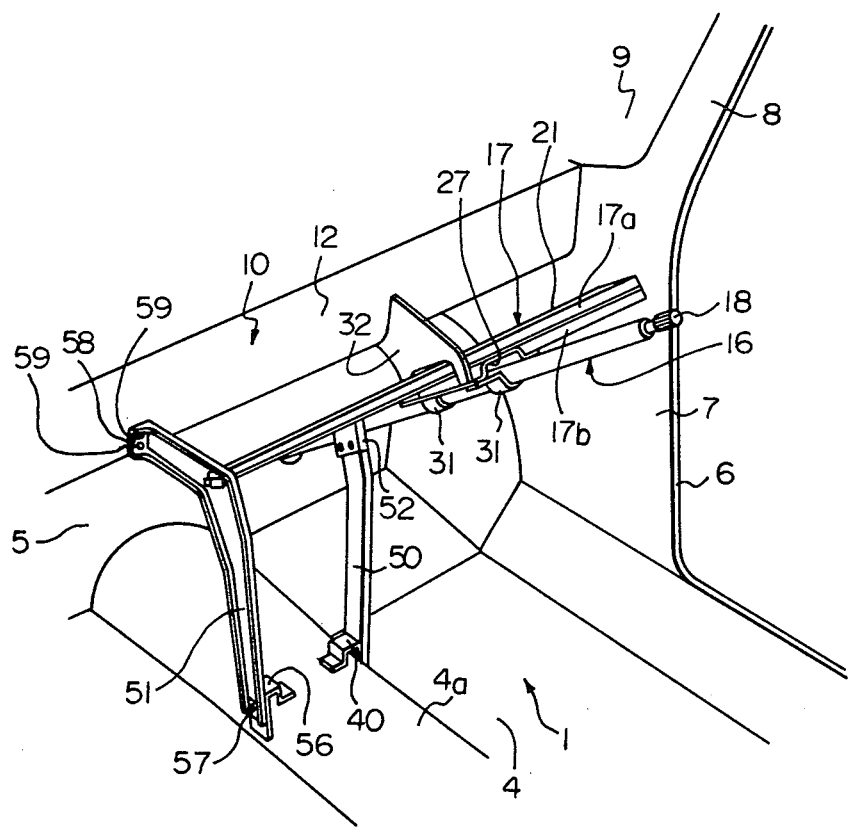
FIG. 10 is a perspective view of the interior of the driver's compartment of a motor vehicle.
Figure 11:
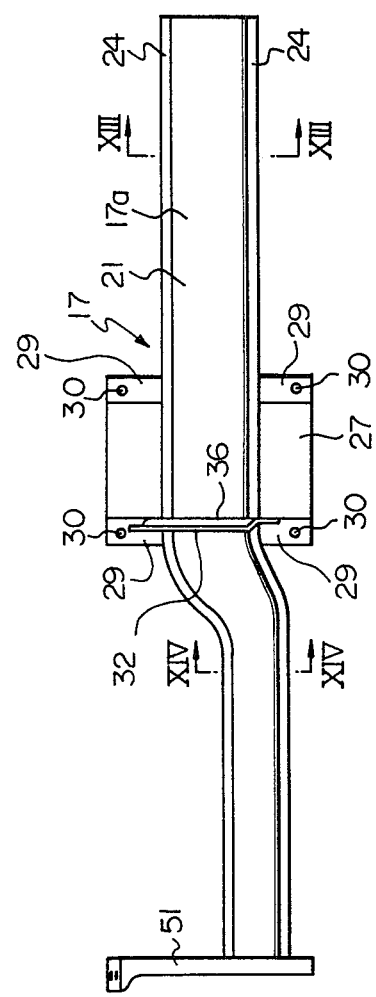
FIG. 11 is a plan view of an alternative embodiment of a steering assembly supporting device illustrated in FIG. 10 according to the present invention.
Figure 12:
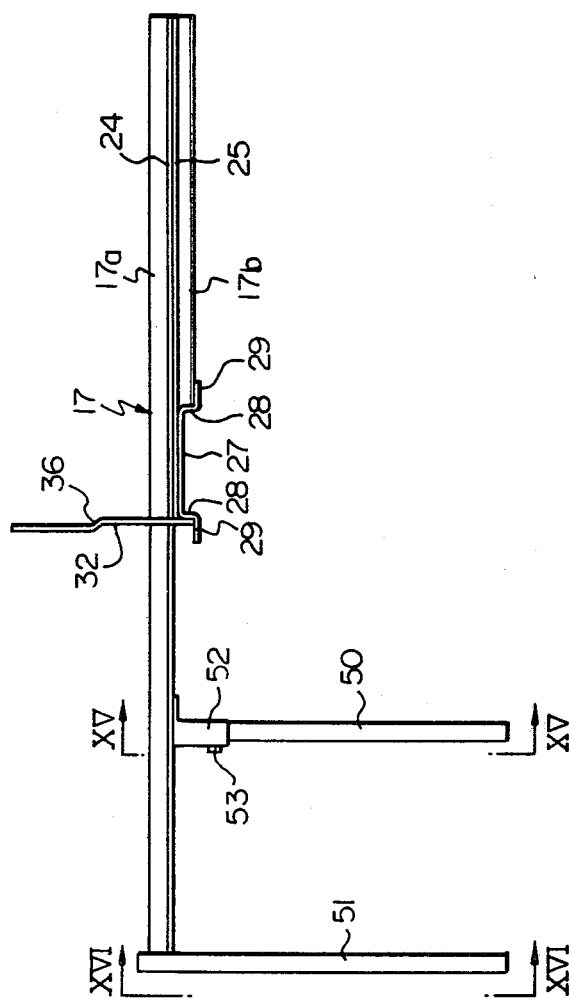
FIG. 12 is a side view of FIG. 11.
Figure 13:
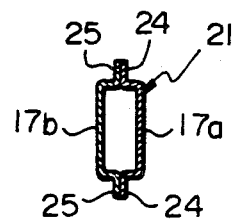
FIG. 13 is a cross-sectional view taken along the line XIII—XIII in FIG. 11.
Figure 14:
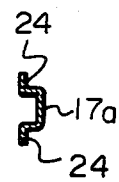
FIG. 14 is a cross-sectional view taken along the line XIV—XIV in FIG. 11.
Figure 15:
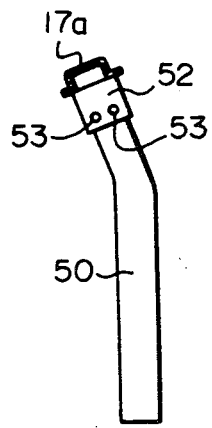
FIG. 15 is a cross-sectional side view taken along the line XV—XV in FIG. 12.
Figure 16:
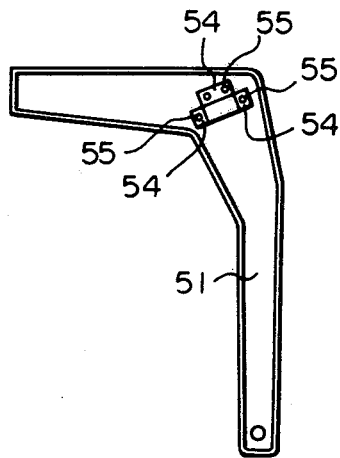
FIG. 16 is a side view taken along the line XVI—XVI in FIG. 12.

FIGS. 10 through 16 illustrates an alternative embodiment. In FIGS. 10 through 16, similar components are indicated with the same reference numerals used in FIGS. 1 through 9. Referring to FIGS. 10 through 12, one of members 17a, forming the steering assembly supporting body 17, terminates at the steering support 27, and only the other member 17b passes through the steering support 27 and extends towards the left in FIGS. 10 through 12. Consequently, the portion of the base portion 21, which is located on the right side of the steering support 27, has a hollow tubular shape as illustrated in FIG. 13, and the portion of the base portion 21, which is located in the left side of the steering support 27 in FIGS. 10 through 12, has a dish shaped cross-section as illustrated in FIG. 14. In addition, the outer end of the base portion 21 is welded onto the cowl side panel 7 or secured onto the cowl side panel 7 by means of bolts at the root portion of the front pillar 8, and the bracket 32, fixed onto the steering support 27, is welded onto the cowl inner panel 10 or secured onto the cowl inner panel 10 by means of bolts. As illustrated in FIGS. 10 through 12, the steering assembly supporting body 17 has a pair of leg portions 50 and 51. As illustrated in FIGS. 10 and 15, a bracket 52 is welded onto the member 17a of the steering assembly support body 17, and the upper end of the leg portion 50 is secured onto the bracket 52 by means of bolts 53. The lower end of the leg portion 50 is welded onto the bracket 40. As illustrated in FIGS. 10 and 16, the end of the member 17a of the steering assembly supporting body 17 has a flange 54 formed thereon, and the leg portion 51 is secured onto the flange 54 by means of bolts 55. As illustrated in FIG. 10, another bracket 56 is fixed onto the raised portion 4a of the floor 4 at a position opposite to the bracket 40, and the lower end of the leg portion 51 is secured onto the bracket 56 by means of a bolt 57. In addition, a flange 58 is formed in one piece on the front end of the leg portion 51 and secured onto the side wall 12 of the cowl inner panel 10 by means of bolts 59.

According to the present invention, the steering support 27 is mounted on the steering assembly supporting body 17 arranged in the rear of the cowl inner panel 10, and the steering tube 19 is supported on the front end and the rear end of the steering support 27. Consequently, since the distance between the supporting point of the steering support 27, at which the steering tube 19 is supported, and the fixing point of the steering support 27, at which the steering support 27 is fixed onto the steering assembly supporting body 17, is short, it is possible to prevent the steering wheel 20 from vibrating when a motor vehicle is driven at a high speed or on a rough load.

While the invention has been described by reference to specific embodiments chosen for purposes of illustration, it should be apparent that numerous modifications could be made thereto by those skilled in the art without departing from the spirit and scope of the invention.

We claim:

1. A steering assembly supporting device of a motor vehicle comprising a steering assembly, a floor, front door opening flanges, cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel, said device comprising:

a hollow tubular L-shaped steering assembly supporting body comprising a leg portion and an integrally formed base portion transversely extending substantially in parallel to the cowl inner panel, said base portion having an inner end, an intermediate portion and an outer end fixed onto the cowl side panel, said leg portion extending downwards from the inner end of said base portion and having a lower end fixed onto the floor midway between said cowl side panels, and;

a bracket extending backwards from the cowl inner panel and having a rear end and a front end fixed onto the cowl inner panel, said rear end being connected to the intermediate portion of said base portion, the steering assembly being supported by the intermediate portion of said base portion.

2. A steering assembly supporting device as claimed in claim 1, wherein said steering assembly supporting body has a hollow tubular shape over almost the entire length thereof.

3. A steering assembly supporting device as claimed in claim 2, wherein said supporting body comprises a first member having a dish shaped cross-section, and a second member having a dish shaped cross-section and fixed to said first member.

4. A steering assembly supporting device as claimed in claim 3, wherein said first member has a pair of outwardly extending flanges, said second member having a pair of outwardly extending flanges, each being welded to the corresponding flange of said first member by spot welding.

5. A steering assembly supporting device as claimed in claim 1, wherein said base portion of said steering assembly supporting device comprises a first portion located between said intermediate portion and said outer end, and having a hollow tubular cross-section, and a second portion located between said intermediate portion and said inner end, and having a dish shaped cross-section, said leg portion being formed separately from said base portion and connected to said second portion.

6. A steering assembly supporting device as claimed in claim 5, wherein said first portion comprises a first member having a dish shaped cross-section, and a second member having a dish shaped cross-section and fixed to said first member.

7. A steering assembly supporting device as claimed in claim 6, wherein said first member has a pair of outwardly extending flanges, said second member having a pair of outwardly extending flanges, each being welded to the corresponding flange of said first member by spot welding.

8. A steering assembly supporting device as claimed in claim 5, wherein said steering assembly supporting device further comprises another leg portion interconnecting said second portion of said base portion to the floor and extending downwards from said second portion.

9. A steering assembly supporting device as claimed in claim 1, wherein said steering assembly supporting device further comprises a steering support fixed onto said intermediate portion of said base portion and supporting thereon a steering tube of the steering assembly.

10. A steering assembly supporting device as claimed in claim 9, wherein said support comprises a front end extending forward from said base portion, and a rear end extending backward from said base portion, the steering tube being supported by both said front end and said rear end of said support.

11. A steering assembly supporting device as claimed in claim 1, wherein said bracket has a transversely extending step portion formed thereon.

12. A steering assembly supporting device as claimed in claim 1, wherein the dash panel has a hole formed therein, the steering assembly having a steering tube which passes through said hole without contacting said dash panel.

* * * * *